March 28, 1950 H. J. HAMMERLY ET AL 2,501,722
CLAMPING DEVICE FOR FACE PLATES, PANEL FRONTS,
OR TRIM FOR ENCLOSED SWITCHES, ETC
Filed Dec. 27, 1946
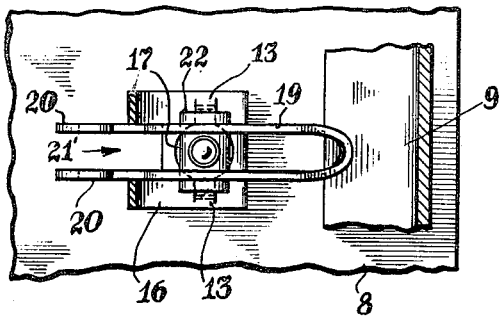
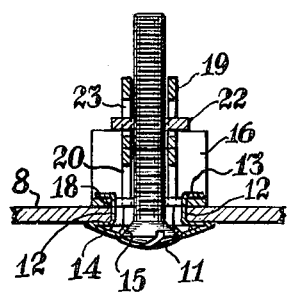
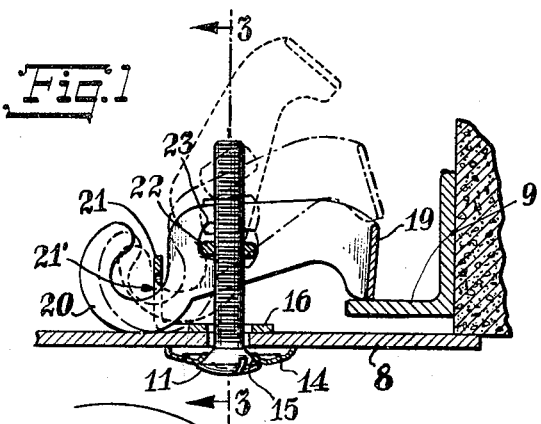
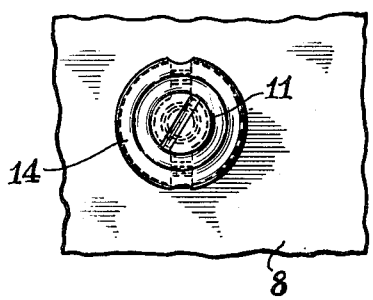
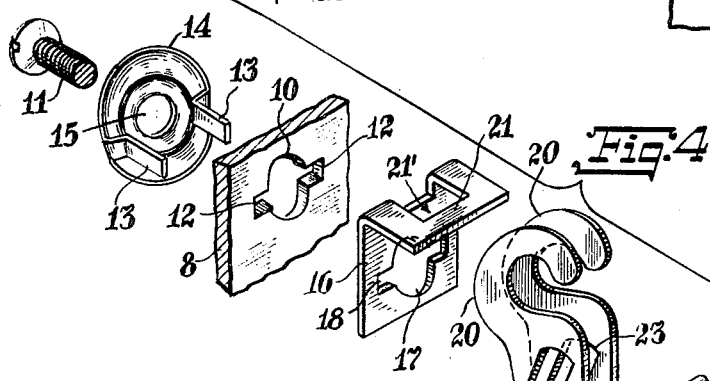
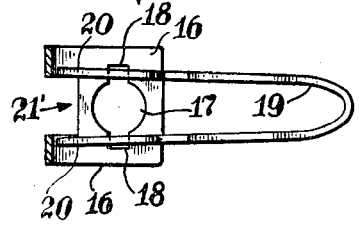
INVENTORS
HERMAN J. HAMMERLY
& ALBERT H. VEITCH
BY
ATTORNEY Patented Mar. 28, 1950

2,501,722

UNITED STATES PATENT OFFICE 2,501,722

CLAMPING DEVICE FOR FACE PLATES, PANEL FRONTS, OR TRIM FOR ENCLOSED SWITCHES, ETC.

Herman J. Hammerly and Albert H. Veitch, Plainville, Conn., assignors to The Trumbull Electric Manufacturing Company, Plainville, Conn., a corporation of Connecticut Application December 27, 1946, Serial No. 718,670

10 Claims. (Cl. 220—24.2)

Our invention relates to devices for clamping a face plate, panel front or trim for an enclosed switch or other receptacle.

The main object is to provide a clamp which is adjustable from the front or outside of the trim and in which an adjusting screw remains at right angles to the plane of the trim and with its head flush with its washer throughout all its useful range of adjustment.

Another object is to provide clamping devices that can be packed and shipped separately from the plates and assembled on the job. The plates can thus be stacked and conveniently handled without damage.

Another object is to eliminate all riveting and welding operations previously necessary.

Another object is to facilitate attachment and adjustment of the clamp and assembly of the parts.

Another object is to provide an assembly which produces a neat and orderly appearance when installed.

A two-armed clamping lever is adjusted by a screw and guided by an angle bracket which is positioned by an outer washer or rosette having lugs interlocking with the trim plate. The lever has curved bearings frictionally and slidably positioned in the bracket and which enable the lever to be adjusted to accommodate various thicknesses or spacings of the support by pressure of the screwdriver on the adjusting screw without tilting said screw.

Fig. 1 is a side view and partial section of a device embodying our invention as applied to a support in one position and showing parts in dotted and dot and dash lines in other retracted open positions.

Fig. 2 is a rear view of the device as applied.

Fig. 3 is a sectional view on the plane of the line 3—3 of Fig. 1.

Fig. 4 is an exploded perspective view of the parts of the device.

Fig. 5 is a rear view showing the clamp lever about to be inserted in the angle guide.

Fig. 6 is a front view of a fragment of a trim plate showing a clamp screw and washer.

The trim, face plate or panel front 8 may be of any suitable material and thickness. The support 9 represents the interior flange of a panel board box, wall box or receptacle which may be of any suitable character. Of course, several clamps will usually be required for securing the face plate in position.

The trim plate is provided with a hole 10 for a clamp screw 11 and with side notches 12 to receive the lugs 13 which project from the opposite edges of the washer 14. The latter has a depressed central portion with a hole and seat 15 for the screw and its head.

The guide bracket 16 has a central hole 17 for the screw and side notches 18 for the lugs 13 which are bent over when assembled as shown in Fig. 3 so as to prevent the bracket from being displaced.

The clamp lever 19 is formed preferably of a single stamping of resilient sheet metal and has two arms terminating in semi-circular or curved bearing hooks 20, 20 adapted to be inserted beneath the cross bar 21 through the opening 21' in the bracket 16. These arms when formed are divergent at a slight angle as shown in Fig. 5 with their ends spaced apart a little farther than the width of the opening 21' between the sides of the bracket 16 so that when the ends of the arms are compressed toward each other and are in place in the opening they will be frictionally positioned in the bracket in engagement with the side edges of the opening 21' thereof thereby preventing accidental rotation of the clamp about the axis of the screw and holding the clamp in adjusted positions.

A cross-piece nut 22 is loosely inserted in the openings 23, 23 of the arms of the clamp 19 and the screw 11 is threaded through it so that when the screw is turned the piece 22 will be moved forward or backward as the case may be to adjust the clamping member. The edges of the nut are rounded off and the openings 23 are sufficiently large and shaped to permit the change of angular relation of the nut to the clamp.

In order, when the clamps are applied, to ensure maintenance of the screw at right angles to the trim, we form the ends of the arms into semi-circular curled or curved bearing hooks 20, 20 which can be inserted through the opening 21' in the bracket. When pressure is exerted by the screwdriver or other tool in turning the screw to draw the clamp to clamping position the screw will remain at right angles to the trim and the hooks 20, 20 will in effect pivot and slide against the back of the trim plate as the clamp is adjusted and drawn to clamping position as shown in Fig. 1 and thus permit adjustment without tilting the screw. The shank of the screw will remain perpendicular or normal to the plane of the trim and the head will therefore be squarely seated in and remain flush with the curved face of the washer 14 in all applied adjustments of the screw and therefore present a neat and orderly appearance.

This construction has the advantage that the panel fronts can be stacked with smooth surfaces in engagement and shipped without danger of marring the finish and in a minimum space as compared with earlier constructions resulting in projections permanently secured to the panel front.

The clamps can be packed and shipped separately and readily applied in the field. The parts when assembled will be held together by simply bending over the ends of the lugs 13 so that the bracket is held in position against rotation and the clamping member is also thus indirectly prevented from rotating when the screw is turned.

To install a face plate or trim the screw 11 of each clamp is turned anti-clockwise so as to tilt the clamp lever 19, for instance to the dotted position of Fig. 1 far enough to permit all of the clamp levers to be inserted through the opening within the supporting flange 9. The clamp levers are frictionally held in position by the engagement of the hook-like ends 20, 20 against the arms of the bracket 16 at the sides of the opening 21'. Of course when the clamp lever is retracted it is not important that the screw be held at right angles to the face plate. A certain amount of tilting of the screw is permissible at this time. The cross bar 21 assists in preventing the clamp lever from being displaced when retracted. When the face plate is in place and the screws are tightened the clamp levers are drawn into engagement with the flange 9 of the wall box and the screws will be forced into positions normal to the plane of the face plate as above described. The face plate may be removed when the clamp levers are retracted. The friction of the arms of the clamp lever in the bracket holds the parts of the clamping device in position and greatly facilitates the removal of the face plate.

It will be observed from Fig. 1 that the hooks 20, 20 are interlocked with the cross bar 21 of the bracket so as to be held loosely by the cross bar in a predetermined sliding and pivotal relation with the trim plate.

We claim:

1. The combination of a trim plate having an opening, a trim clamp including a screw for passing through the opening, a rocking clamp member having a pair of resilient arms with semicircular ends for turning and sliding on the inner face of the trim plate, a nut on said screw co-acting with the arms of said clamp member for rocking said member about an axis at right angles to the screw when the screw is rotated, a guide bracket on said trim plate having an opening through which said arms are movable, said arms being biased to frictionally engage the sides of the opening in said bracket for preventing the rotation of the clamp member about the axis of the screw and for holding the clamp member in adjusted positions, and a member having lugs extending through the openings in and interlocking with said trim plate and guide bracket to prevent rotation of said guide bracket and clamp member around said screw.

2. As an article of manufacture, a trim clamp assembly comprising a U-shaped clamping member having perforated side arms connected together at one end of the member, the other ends of the arms having curved bearing surfaces, a nut loosely located in the perforations of said side arms, a headed screw adjustable in said nut between said side arms, a bracket having an opening for said screw and another opening having side walls for guiding the curved ends of the clamp arms which have curved bearing surfaces, a washer having a central opening for said screw and having a seat for the screw head and lugs adapted to interlock with a trim plate and with said bracket to prevent rotation of said bracket and said clamp member around said screw.

3. The combination of a trim plate having an opening with a side notch, a trim clamp comprising a clamping member having perforated side arms, one end of each arm having a curved bearing surface, a nut loosely located in the perforations of said arms, a headed screw adjustable in said nut in said arms, an angle bracket having an opening for said screw and another opening having side walls for guiding the ends of said clamp arms, a washer having a central opening for said screw and its head and lugs interlocked with said trim plate and with said bracket to prevent rotation of said bracket and said clamp member around said screw.

4. In combination with a trim plate having an opening therein, a clamp assembly for clamping said plate to a support comprising a washer on the outside of said plate around its opening, an angle bracket having one wall on the inner surface of the plate having an opening in alignment with the opening in said plate, the other wall of said bracket extending at an angle to the plane of the trim plate and having an opening therein, said washer having lugs for interlocking the washer and bracket to the plate, an elongated screw extending through said aligned openings and inwardly of the plate, a clamping member having spaced arms straddling the inner portion of said screw and having their ends extending thru the opening in the angled wall of the bracket for interlocking with said bracket, said arms being provided with aligned side openings and a nut member on said screw loosely mounted in and extending into said side openings whereby upon turning of the screw said clamping member will floatingly move toward or away from clamping position without rotating said clamping member about said screw.

5. A trim clamping device comprising a bracket having a perforated wall for attachment to the back of a trim plate, said bracket having another wall extending at substantially right angles to the first mentioned wall and having an opening, a washer for application to the front of the trim plate and having a passage and having lugs for interlocking with the trim plate and with said bracket, a clamping device having side arms with recesses between its ends and having curved hook-like ends movable in the opening in the bracket and adapted to slidably engage the inner face of the trim plate, a screw passing through said washer and the perforated wall of said bracket and between the arms of said lever and a nut on said screw having its ends extending into the recesses of said arms.

6. As an article of manufacture, a trim clamp assembly comprising a U-shaped clamping member having perforated side arms connected together at one end of the member, and biased tending to spread said arms, the other ends of the arms being movable and having bearing surfaces, a nut loosely located in the perforations of said side arms, a headed screw adjustable in said nut between said side arms, a bracket having an opening for said screw and another opening having side walls for guiding and frictionally holding the movable ends of the clamp arms, a washer having an opening and bearing for said screw and lugs adapted to interlock with a trim plate and with said bracket to prevent rotation of said bracket and said clamping member around said screw.

7. A trim clamping device comprising a bracket having a perforated wall for attachment to the back of a trim plate, said bracket having another wall extending at substantially right angles to the first mentioned wall and having a cross bar and an opening, a washer for application to the front of the trim plate and having a passage for a screw and having lugs for interlocking with the trim plate and with said bracket, a clamping device having side arms with recesses between its ends and having hook-like ends movable in the opening beneath the cross bar of the bracket and frictionally engaging said bracket to prevent accidental turning of said clamping device, a screw passing through said washer and through the perforated wall of said bracket and between the arms of said lever and a nut on said screw extending into the recesses of said arms.

8. The combination of a trim plate having an opening, a trim clamp including a screw for passing through the opening, a rocking clamp member having a pair of resilient arms with curved hook-like ends for turning and sliding on the inner face of the trim plate, a nut on said screw coacting with the arms of said clamp member for rocking said member about an axis at right angles to said screw when the screw is rotated, a guide bracket on said trim plate having an opening through which said arms are movable, said arms being biased to frictionally engage the sides of the opening in said bracket for preventing the rotation of the clamp member about the screw and for holding the clamp member in adjusted positions, said bracket having a cross bar acting as a stop for said hook-like ends of the clamp member.

9. A clamping device for trim plates and the like comprising a bracket having a perforated base portion to be supported in line with a hole in the trim plate and another guide portion projecting at an angle to the base portion, a clamping lever positioned by said guide portion, a washer to be applied to the face of the trim plate and having a passage in line with the opening in the trim plate and in line with the perforation in the base of the bracket, and said washer having bendable lugs insertable through the trim plate and through the base of the bracket for preventing the bracket from rotating about said screw, a screw insertable through said washer and through the trim plate and said base of the bracket and having a nut interlocked with said clamping lever whereby the clamping lever can be actuated by rotating said screw.

10. The combination of a trim plate having an opening, a guide bracket secured to said trim plate provided with a portion spaced from said opening extending at a substantial angle to said trim plate, said portion being provided with an opening, a rocking clamp member having a pair of substantially parallel resilient arms secured together at one end of said member and provided with curved portions on their other ends extending through said opening, said arms being biased apart into frictional engagement with opposite side walls of said opening and said curved portions interlocking with said bracket so as to be held by said bracket in sliding and pivotal relation with said trim plate for rocking movement of said member on said curved portions to move said one end with relation to said trim plate, and a screw extending through said opening in said trim plate and connected to said clamp member for rocking said clamp member.

HERMAN J. HAMMERLY.
ALBERT H. VEITCH.

REFERENCES CITED

The following references are of record in the file of this patent:

UNITED STATES PATENTS

| Number | Name | Date |
|---|---|---|
| 2,181,278 | Lantz, Jr. | Nov. 28, 1939 |